No. 720,658. PATENTED FEB. 17, 1903.
S. BOBO.
BICYCLE SEAT POST.
APPLICATION FILED MAR. 29, 1902.
NO MODEL.
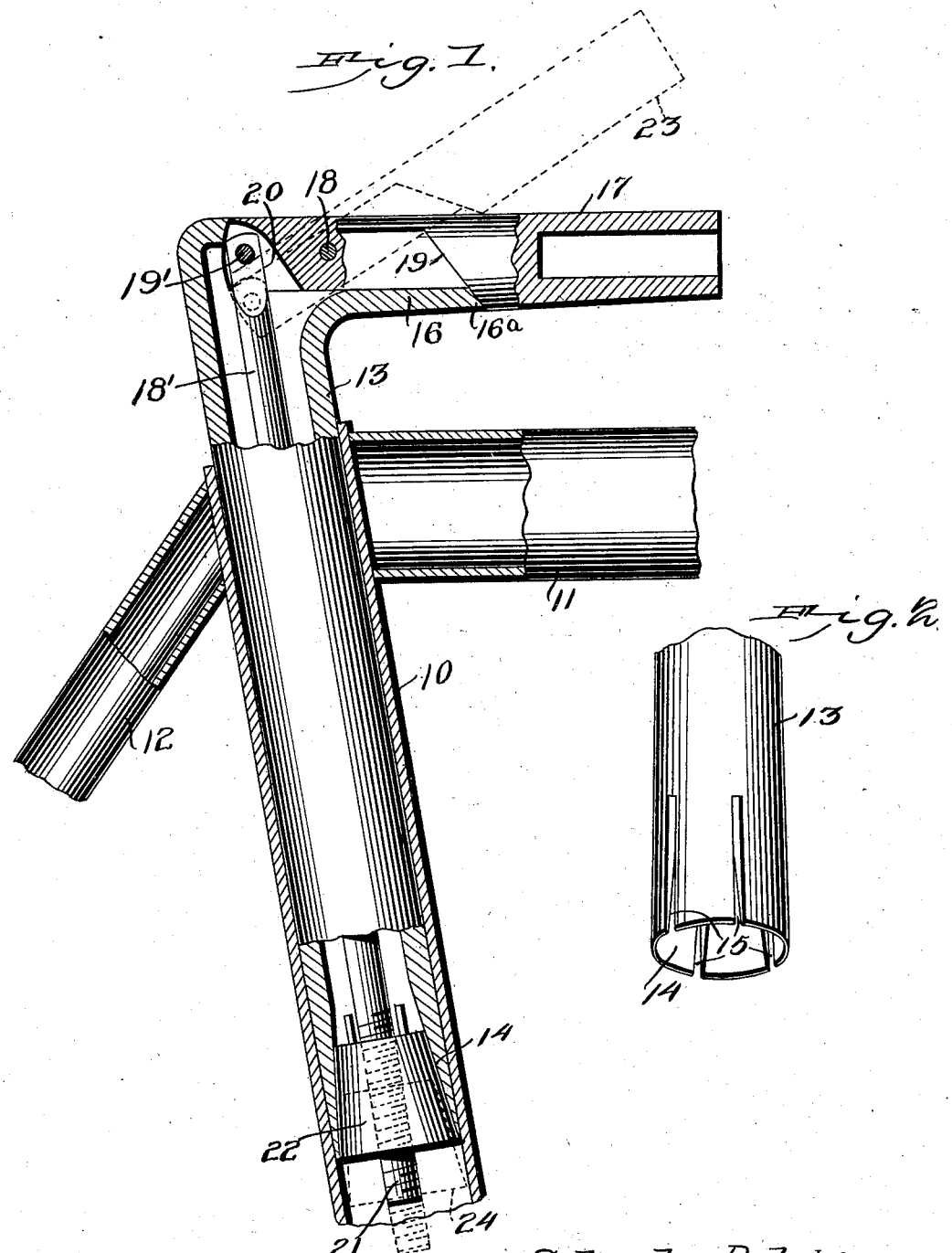

UNITED STATES PATENT OFFICE.

SYLVESTER BOBO, OF ALBANY, OHIO.

BICYCLE SEAT-POST.

SPECIFICATION forming part of Letters Patent No. 720,658, dated February 17, 1903.

Application filed March 29, 1902. Serial No. 100,609. (No model.)

*To all whom it may concern:*

Be it known that I, SYLVESTER BOBO, a citizen of the United States, residing at Albany, in the county of Athens and State of Ohio, have invented a new and useful Bicycle Seat-Post, of which the following is a specification.

This invention relates to the seat-posts of bicycles, and has for its object the construction of a device whereby the seat may be quickly adjusted without the necessity for the attachment or detachment of any part, the loosening or tightening of any screws or nuts, or the employment of any implement or tool; and the invention consists in certain novel features of the construction, as hereinafter shown and described, and specifically pointed out in the claims.

In the drawings illustrative of the invention, Figure 1 is a sectional elevation of a portion of the framework of a bicycle with the improved seat-post arranged therein. Fig. 2 is a perspective view of a portion of the lower end of the post detached.

The device may be applied to any form of bicycle-frame, and for the purpose of illustration I have shown it applied to a frame of the ordinary construction, 10 representing a portion of the seat-standard, 11 a portion of the main horizontal member, and 12 a portion of one of the rear braces.

The main seat-post is indicated at 13 in tubular form and engaging the standard 10 slidably and with its lower end conical on the interior at 14 and with longitudinal slits 15, formed through the conical portion, as shown. At its upper end the post is turned off substantially at right angles, as at 16, and with the upper part of this turned-off portion opening upward and forming a socket for the seat-bracket 17, which is pivotally supported therein at 18. The bracket 17 is reduced in size where it engages the portion 16, with an angular shoulder 19 engaging the correspondingly angular outer end of the portion 16 to form a stop to limit the downward movement of the bracket. By this means the outer end of the portion 16 at 16ª forms a firm support for the bracket and prevents it from moving below a horizontal line.

The standards 10 of bicycles usually stand at a rearwardly-trending angle, while the seat-brackets are usually supported in a horizontal plane, so that the portion 16 will generally be at a slight angle to the body of the post 13, as shown. The outline of the part 17 is formed to merge into the part 16 when they are closed, as in full lines in Fig. 1, so that when closed they have the appearance of being in one piece for symmetry of appearance. Centrally disposed in the tubular member 13 is a rod 18', pivoted at 19' in a recess 20 in the inner end of the seat-bracket 17 and with its lower end threaded, as at 21, and provided with a conical nut 22, adapted to engage the conical portion 14 of the member 13, as shown in Fig. 1.

The slits 15 provide for the expansion of the lower end of the tubular member 13, so that any upward force to which the cone-nut 22 may be subjected will expand the lower end of the post 13 and cause it to tightly "grip" the interior of the post and prevent any vertical movement thereof in the standard 10. It will be readily understood, therefore, that if the seat-bracket be elevated, as indicated by dotted lines at 23 in Fig. 1, the conical nut 22 will be correspondingly depressed, as indicated by dotted lines at 24 in the same figure, and thereby release the member 13, so that the seat may be adjusted in the member 13. When the adjustment is completed, the return of the seat-bracket to its normal horizontal position will elevate the cone-nut 22 and again clamp the member 13 firmly to the member 10 and maintain it immovable therein so long as the seat remains in its operative or normal position. The screw-threads 21 provide for the proper adjustment of the cone-nut 22, so that the grip may be regulated, and also provide for the "take-up" in event of the wearing of the parts. By this means the movement may be so delicately adjusted that the pressure of the cone-nut 22 when the seat-bracket is lowered to its normal operative position shall be just sufficient to expand the part 14 of the member 13 to a sufficient extent to lock the members 13 and 10 together and without leaving an open joint between the parts 16 and 17. By this simple means the seat may be very readily and quickly adjusted without detaching any parts or employing any tools, such as wrenches, screw-drivers, or the like.

The device is very simple, compact, and easily constructed, and being of few parts is not liable to be disarranged or broken.

The proportions may be modified to adapt it to the various makes of bicycles, and the device may be otherwise modified in minor particulars without departing from the spirit or scope of the invention or sacrificing any of its advantages.

What I claim is—

1. In a device of the class described, the tubular seat-post having its lower end reduced interiorly to form a conical seat, the said lower end being also provided with longitudinal slits, and the upper end of the seat-post being extended horizontally at less than a right angle to the body of said seat-post, said horizontal extension being cut off slantingly at the front and having a longitudinal opening in its upper side, in combination with a seat-supporting bracket mounted pivotally in the horizontal extension of the seat-post and engaging the longitudinal opening and the slanting front end of said horizontal extension, a connecting-rod having pivotal connection with said seat-supporting bracket in rear of the fulcrum of the latter and extending downwardly through the tubular seat-post, and a conical nut adjustable upon the lower threaded end of said connecting-rod and adapted to bear against the conically-reduced inner wall of the split lower end of said seat-post, substantially as set forth.

2. The combination of the seat-post having a horizontally-extending bracket cut off slantingly at its front end and having a longitudinal slot in its upper side, with the seat-supporting bracket, mounted pivotally in the slot of the horizontal extension of the seat-post and having a slanting portion bearing against the slanting front end of said extension, and means operated by said supporting-bracket for securing the seat-post in its supporting-tube, substantially as set forth.

In testimony that I claim the foregoing as my own I have hereto affixed my signature in the presence of two witnesses.

SYLVESTER BOBO.

Witnesses:
J. L. BOBO,
A. C. DAILEY.